Feb. 6, 1945.  T. E. D. BILDE  2,368,700
ELECTRIC LIGHTING DEVICE
Filed May 30, 1942  2 Sheets-Sheet 2
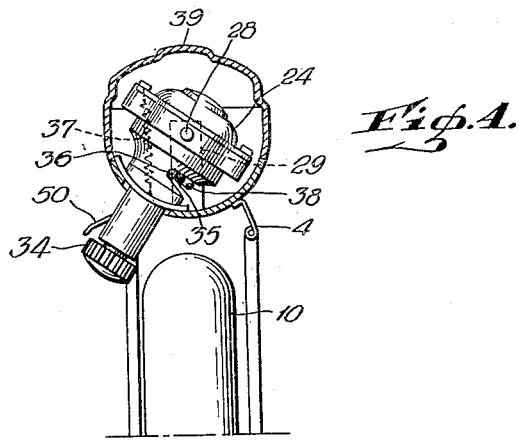
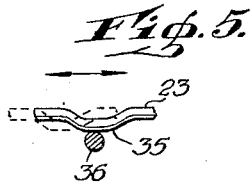
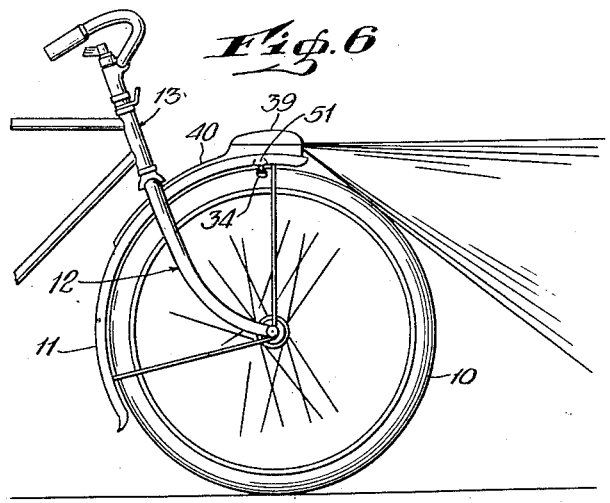

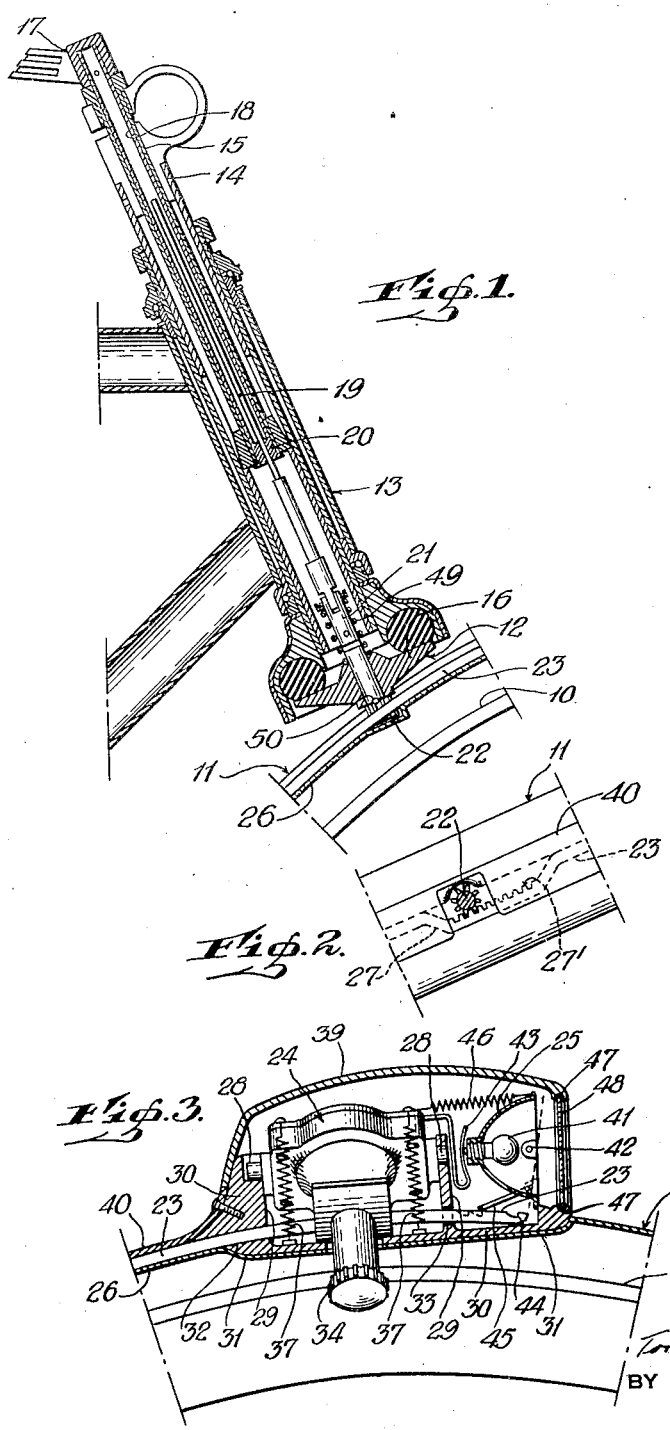

Patented Feb. 6, 1945

2,368,700

UNITED STATES PATENT OFFICE 2,368,700

ELECTRIC LIGHTING DEVICE

Tord Erik Daniel Bilde, Stockholm, Sweden

Application May 30, 1942, Serial No. 445,251
In Sweden June 21, 1941

10 Claims. (Cl. 240—7.6)

The present invention relates to an electric lighting device for vehicles, more particularly cycles or the like. The device is equipped with an electric incandescent lamp and a generator for generating the current required by said lamp, the generator being adapted to be driven by a wheel of the vehicle. In hitherto known lighting devices of this kind it has been the common practice to provide a construction in which the generator and the lamp or a reflector cooperating with the latter are placed individually on the vehicle. This has, however, certain disadvantages, because exterior wiring for the current must be provided from the generator to the lamp, and as, moreover, both the generator and the lamp with its reflector must be placed in an easily accessible position on the vehicle, the different parts of the lighting device may be easily damaged, or may even be stolen. As the generator and projector are arranged at different places of the vehicle, they must be operated individually, this being a drawback which makes itself felt particularly in the case of cycles.

The invention designs to eliminate these drawbacks in hitherto known lighting equipments for vehicles, and is characterized chiefly in that the generator for generating the required electric current and the projector are assembled into a unit and preferably housed in a common casing. In a suitable embodiment of the invention said casing is made integral with one of the mud guards of the vehicle. If desired, the projector may be rotatably or pivotally connected to the casing, one bounding wall of which may consist of the mudguard. Also the generator itself may suitably be movably connected to said casing, so that a driving wheel connected to the latter may be alternately connected with one of the wheels of the cycle or removed from it. The lighting device is suitably provided with a regulating device operable, if desired, from the handle bar of the cycle for adjusting the reflector and the generator, respectively. For the purpose of transmitting the electric current from the generator to the incandescent lamp there may preferably be provided a resilient contact against which one of the poles of the lamp is intended to slide. The lighting device may preferably be connected to the front end of the fore mud guard of the cycle which extends so far ahead of the handle bar that the light of the projector can strike the road ahead of the cycle without being hampered by the wheel of the cycle.

The invention will be hereinafter more particularly described with reference to the accompanying drawings from which the characteristic features of the invention will be seen.

Fig. 1 is a section of the handle bar portion of a cycle with a regulating device for a lighting device according to the invention.

Fig. 2 shows a detail of the regulating device, partly in section.

Fig. 3 is a longitudinal section of a lighting device formed integral with a mud guard.

Fig. 4 is a cross section of the device according to Fig. 3.

Fig. 5 is a detail of a member intended for regulating the lighting generator.

Fig. 6 shows the fore part of a cycle provided with a lighting device according to the invention.

In the drawings, 10 designates the front wheel of the cycle and 11 a mud guard for said wheel. The fork of the cycle is designated by 12, while the front tubular portion of the frame is designated by 13.

The regulating device made integral with the mud guard 11 and intended for the lighting device is located partly in the steering post of the cycle, passing through a mounting post 14, more particularly through a tension sleeve 15 in the central part 16 of the latter and the fork 12, and partly on the mud guard 11. The part of the regulating device located in the steering post comprises a lever arm or the like 17, an operating sleeve 18 journalled in the tension sleeve 15 and an operating rod 19, preferably rectangular in section. Said rod is axially slidable in an end piece 20 on the sleeve 18, and is entrained by the rotation of the parts 17, 18 and 20 rigidly connected to each other. Moreover, the regulating device comprises a double link 21 and a toothed wheel 22. By means of the latter and a rack 23 cooperating with it and slidably mounted in the mud guard 11, the operating motion of the arm 17 may be transferred to the generator 24 and the reflector 25 of the lighting device. The rack 23 is located in a recess 26 in the upper part of the mud guard and curved with the same radius as the bottom of the recess. At that part which bears against the toothed wheel 22 the rack 23 is provided with an offset part 27 in which teeth 27' are provided in a number corresponding to the motion of the wheel 22. The offset part 27 makes it possible to locate the rack 23 on the central part of the mud guard 11.

The generator 24 is, through the medium of two pins 28, pivotally journalled in a frame 30 provided with bearing pedestals 29, said frame being arranged in a recess 31 made in the mud guard 11. Said bearing pedestals are provided with openings 32 or 33, respectively, through which runs the rack 23. Owing to this pivotal mounting of the generator 24, a driving wheel 34 fitted to the armature shaft thereof, may alternately be brought to bear against the wheel 10 of the cycle or be removed from said wheel. As is shown in Fig. 5, the rack 23 is provided with a cam portion 35 which, upon axial motion of the rack in one direction, bears directly against the shaft 36 (see Fig. 4) of the generator 24 for the purpose of removing the driving wheel 34 from the wheel of the cycle. On the motion of the rack 23 in the opposite direction the generator is drawn by two springs 37 towards the wheel of the cycle in such a way that the driving wheel 34 is brought to bear against it. The draw springs 37 are arranged between the upper part of the generator and the bottom of the frame 30. For the purpose of making possible a cooperation of the rack 23 and the generator shaft 36 the shaft is, as seen in Fig. 4, uncovered by an opening 38 in the generator casing. The generator 24 and the reflector 25 are surrounded by a common casing 39. The latter is formed rearwardly with a strip 40 serving as a cover for the recess 26 accommodating the rack 23.

In front of the generator 24 the reflector 25 carrying an incandescent lamp 41 is pivotally journalled on two pins 42 connected to the casing 39. For the purpose of transmitting current from the pivoted generator to the lamp 41, which is pivotal with the reflector 25, a resilient contact 43 is mounted on the generator and positioned so as to be slidably contacted by the center terminal of the lamp. In this manner a sure transmission of current is obtained in different positions of the lamp. The reflector 25 is swung by the rack 23 provided with a notch 44 which cooperates with a resilient link 45 connected to the lower part of the reflector. Said link is adapted to bear slidably against the upper edge of rack 23 and to drop into and be engaged by the notch 44 when the rack is moved to the left, as shown in Fig. 3. Pivoting of the reflector 25 by the rack 23 is resisted by a tension spring 46 arranged between the upper part of the generator and the reflector, which spring returns the reflector when the rack is moved to the right. In Fig. 3 the reflector 25 is shown in the normal position, that is, the cone of light rays is directed straight forwards. The swinging motion of the reflector is limited in the end positions by abutments arranged in front of the reflector in the frame 30 or the casing 39, respectively. Movement of the rack 23 to the left, as viewed in Figs. 2, 3 and 5, first causes the cam 35 to move to the dotted line position shown in Fig. 5, thus permitting springs 37 to pivot the generator to bring the roller 34 into contact with the tire 10. During this movement, the link 45 slides on top of the rack 23 and consequently the reflector 25 is not tilted. However, if the rack 23 is moved farther to the left the link 45 engages the notch 44 in the rack, thus tilting the reflector against the tension of spring 46. This further movement of the rack does not affect the pivotal position of the generator, as the cam 35 merely moves further to the left from the shaft 36. In the casing 39 and the frame 30 there is arranged a groove 47 for accommodating a protecting glass 48 for the lighting device. This glass may, if desired, consist of a lens.

In the regulating device located in the steering gear of the cycle there is provided a locking device comprising a pressure spring 49, a pin 50 running through the shaft of the toothed wheel and a number of grooves cooperating with said pin and fitted on the underside of the fork centre 16. On the rotation of the regulating device the pin 50 may, owing to the action of the spring 49, fall alternately into these grooves, the regulating device being locked in different positions. The mud guard 11 is, just in front of the generator, provided with an extending part 51 for the purpose of protecting the driving wheel 34 against outer damage.

What I claim is:

1. In a cycle, a fork having a hollow steering post, a wheel rotatably mounted in the fork, a mud guard secured to the fork, a housing secured to said mud guard ahead of said fork, a generator having an armature shaft, a friction roller on said shaft, means for pivotally mounting said generator within said housing with said shaft extending therefrom so that said roller is disposed adjacent to said wheel, a reflector pivotally mounted within said casing, a rotatably mounted control member extending through said hollow steering post, a longitudinally movable bar extending along said mud guard from said post to within said housing, means for moving said bar in response to rotation of said control member, and means responsive to successive movements of said bar for independently pivoting said reflector and said generator.

2. In a cycle, a fork having a hollow steering post, a wheel rotatably mounted in the fork, a mud guard secured to the fork, a housing secured to said mud guard ahead of said fork, a generator having an armature shaft, a friction roller on said shaft, means for pivotally mounting said generator within said housing with said shaft extending therefrom so that said roller is disposed adjacent to said wheel, a reflector pivotally mounted within said casing, a rotatably mounted control member extending through said hollow steering post, a longitudinally movable bar extending along said mud guard from said post to within said housing, a cover plate associated with said mud guard for enclosing said bar, means for moving said bar in response to rotation of said control member, and means responsive to successive movements of said bar for independently pivoting said reflector and said generator.

3. In a cycle, a fork having a hollow steering post, a wheel rotatably mounted in the fork, a mud guard secured to the fork, a housing secured to said mud guard ahead of said fork, a generator having an armature shaft, a friction roller on said shaft, means for pivotally mounting said generator within said housing with said shaft extending therefrom so that said roller is disposed adjacent to said wheel, a reflector pivotally mounted within said casing, a rotatably mounted control member extending through said hollow steering post, a longitudinally movable bar extending along said mud guard from said post to within said housing, a pinion secured to the lower end of said control member, teeth formed on said bar and engaging said pinion, and means responsive to successive movements of said bar for independently pivoting said reflector and said generator.

4. In a cycle, a fork having a hollow steering post, a wheel rotatably mounted in the fork, a mud guard secured to the fork, a housing secured to said mud guard ahead of said fork, a generator having an armature shaft, a friction roller on said shaft, means for pivotally mounting said generator within said housing with said shaft extending therefrom so that said roller is disposed adjacent to said wheel, a reflector pivotally mounted within said casing, a rotatably mounted control member extending through said hollow steering post, a longitudinally movable bar extending along said mud guard from said post to within said housing, means for moving said bar in response to rotation of said control member, means responsive to successive movements of said bar for independently pivoting said reflector and said generator, and means tending to retain said control member in a plurality of selected positions.

5. In a cycle, a fork having a hollow steering post, a wheel rotatably mounted in the fork, a mud guard secured to the fork, a housing secured to said mud guard ahead of said fork, a generator having an armature shaft, a friction roller on said shaft, means for pivotally mounting said generator within said housing with said shaft extending therefrom so that said roller is disposed adjacent to said wheel, a reflector pivotally mounted within said casing, a rotatably mounted control member extending through said hollow steering post, a longitudinally movable bar extending along said mud guard from said post to within said housing, means for moving said bar in response to rotation of said control member, a cam on said bar cooperating with said generator for pivoting the latter to bring said roller into frictional engagement with said wheel upon movement of said bar, and a member secured to said reflector and engageable with a surface on said bar at right angles to the longitudinal direction of the latter for pivoting said reflector upon further movement of said bar.

6. In a cycle, a fork having a hollow steering post, a wheel rotatably mounted in said fork, handle bars having a hollow mounting post telescopically adjustable within said steering post, a generator having an armature shaft, a friction roller on said shaft, means for pivotally mounting said generator with respect to said fork with said roller adjacent to said wheel, a reflector pivotally mounted with respect to said fork, rotatably mounted control means extending through hollow posts, said means including a member carried by said mounting post and a member carried by said steering post, said members being in telescopic engagement and having a non-circular cross-section whereby they are fixed against rotation with respect to each other, and means responsive to successive rotational movements of said control means for independently pivoting said generator and said reflector.

7. A unitary lighting device for a vehicle for independently generating light, and directing such light in the position desired, and comprising in combination with a vehicle having a wheel and a guard therefor, of a housing on said guard, a light reflector pivotally mounted for independent pivotal movement in said housing so that the light can be directed in different positions, a generator pivoted for independent movement in said housing and having an armature shaft extending therefrom, a friction roller on said shaft disposed adjacent said wheel, operating means for moving said generator to bring said roller in contact with said wheel, unitary means for remotely controlling the independent pivoting of said reflector and generator, and a sliding electric contact between said generator and reflector for establishing an electric circuit therebetween regardless of the pivotal positions of said reflector and generator.

8. The combination with a cycle having a front wheel and a front mud guard therefor, of a lighting unit including a housing on said mud guard, a generator including an armature shaft, a friction roller on said shaft, means for pivotally mounting said generator in said housing with said shaft extending therefrom so that said roller is disposed adjacent said wheel, means for pivoting said generator to bring said roller into and out of frictional engagement with said wheel, a reflector pivotally mounted within said casing, means for pivoting said reflector for directing light in the direction desired, and a unitary operating device associated with said housing for manipulating the pivotal means for both the generator and the reflector independently of each other.

9. The structure defined in claim 8, and remote control means connected with said unitary operating device for actuating the same.

10. The structure defined in claim 8, said operating device comprising a bar reciprocable in said housing to successively cause pivotal movement of both the generator and the reflector.

TORD ERIK DANIEL BILDE.